2 Sheets—Sheet 1.

G. W. SWETT.

FURNACE FOR SMELTING AND TREATING METALS.

No. 7,468. Reissued Jan. 16, 1877.

Witnesses
Jno. Lord
Louis Loewenstein

George W. Swett
by M. E. Hagan his Attorney
Inventor

N. PETERS, PHOTO-LITHOGRAPHER, WASHINGTON, D. C.

2 Sheets—Sheet 2.

G. W. SWETT.

FURNACE FOR SMELTING AND TREATING METALS.

No. 7,468. Reissued Jan. 16, 1877.

Witnesses
Wm Lord
Louis Loewenstein

Geo W. Swett
by W. E. Hagan his
Attorney
Inventor

N. PETERS, PHOTO-LITHOGRAPHER, WASHINGTON, D. C.

UNITED STATES PATENT OFFICE.

GEORGE W. SWETT, OF SHAFTSBURY, VERMONT.

IMPROVEMENT IN FURNACES FOR SMELTING AND TREATING METALS.

Specification forming part of Letters Patent No. 38,186, dated April 14, 1863; reissue No. 7,468, dated January 16, 1877; application filed August 25, 1876.

*To all whom it may concern:*

Be it known that I, GEORGE W. SWETT, of the town of Shaftsbury, county of Bennington, and State of Vermont, have invented a new and Improved Furnace for Smelting and Treating Metals, and for Reducing Ores, of which the following is a specification:

The object of my invention is to construct a furnace having an upper melting-hearth and a receptacle or lower hearth for storing and accumulating melted metal, connecting with the furnace, and both arranged within the same inclosure, and heated by the same fire. I also design and apply this construction to melt iron in the upper hearth, and to puddle or beneficiate it in the lower receptacle or hearth, and also to reduce and treat metallic ores.

The advantages of a furnace thus arranged are, that iron can be melted without being in contact with the fuel and its impurities, and the uncertainty and contingent difficulties which affect iron under the influence of the blast in ordinary cupola-furnaces; that iron may be melted and accumulated in a melted state for the production of large castings; that the process of melting and puddling may be continuous, for, while one charge of metal may be puddled or beneficiated by treatment in the lower hearth, another charge may be melted and ready for puddling when the lower charge is finished, and both operations performed by the same fire with much time and fuel saved.

Figure 1:
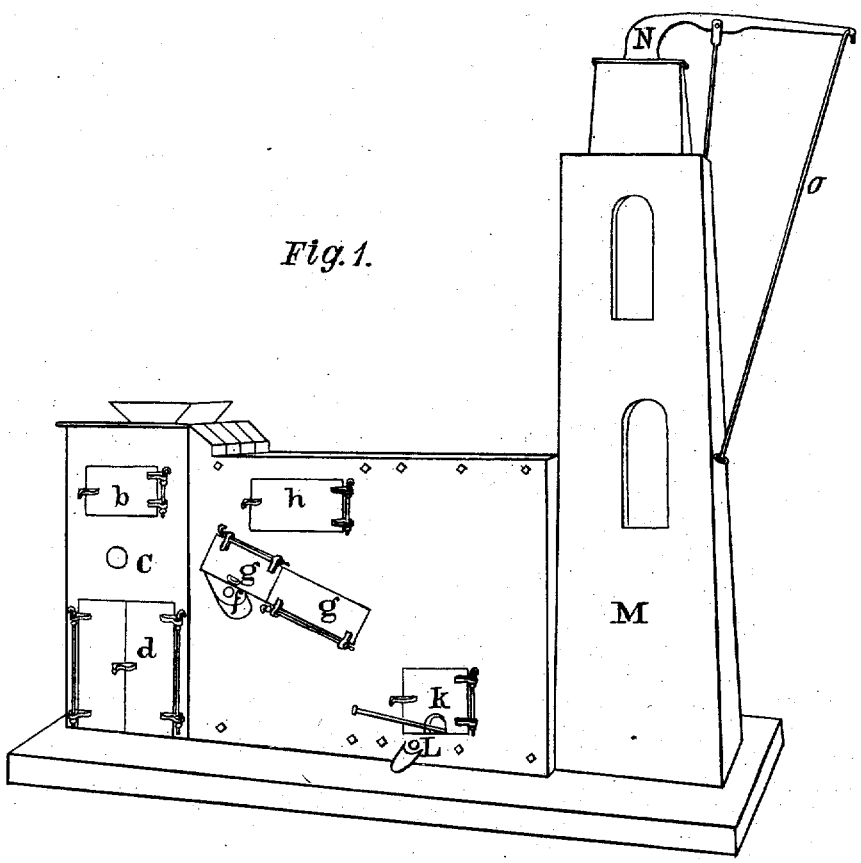

Figure 1 of the accompanying drawings illustrates my improved furnace in perspective, in which the chimney is shown at M, the ash-pit and blast-area at *d*, the fuel-supply hopper at A, a door opening into the upper melting hearth or incline at *h*, and a door opening into the lower hearth or receptacle at *k*. At *g g* is shown a door opening into the side of the furnace opposite the gutter, through which the melted metal in the upper hearth flows into the lower hearth or receptacle. *f* designates a tap-hole in the upper hearth to draw the melted metal therefrom when desired, and L designates one for the same purpose in the lower hearth.

Figure 2:
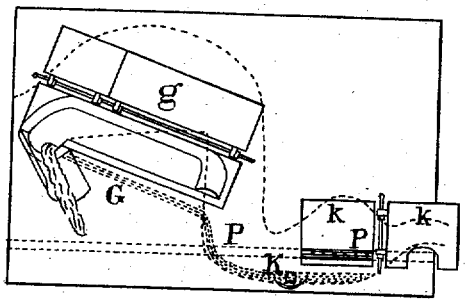

Fig. 2 shows a condensed view of the furnace in elevation, with open doors, showing the position of the melted metal flowing from the upper hearth through the gutter G to the lower hearth or receptacle K, the metal being designated by a series of parallel dotted lines. *g g* show the open doors opposite the gutter. *k* designates the lower open door, and P P represent a perforated pipe, to be used for the introduction of air to decarbonize the melted metal when desired, or such gases as may be applied to beneficiate the metal.

Figure 3:
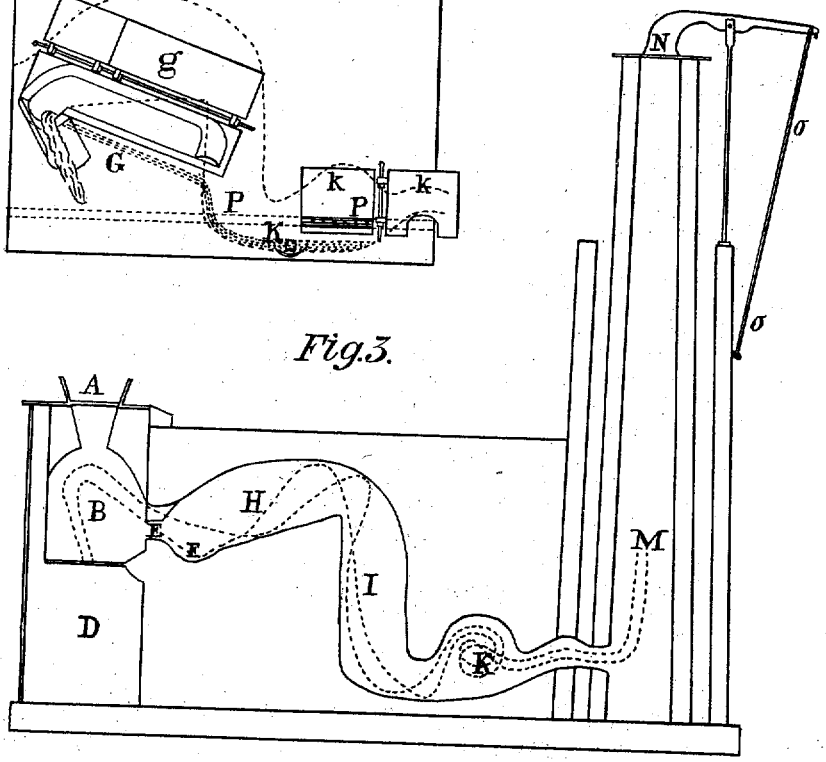

Fig. 3 illustrates a longitudinal vertical section of the furnace, taken through the center, and in which the hopper for supplying fuel is designated at A, the fire-chamber at B, the bridge-wall at E, the upper melting-hearth at F, the area covered by a reverberatory arch at H, the space connecting the upper melting-hearth with the lower one at I, the lower hearth or receptacle at K, the chimney at M, the course of the heat and flame in the furnace being designated by dotted lines, and the blast-area below the fire designated at D.

Having thus designated and illustrated my furnace, its operation is described as follows: When it is desired to use this form of furnace for melting purposes alone, and the lower hearth used as a receptacle for melted metal, the metal to be employed is placed upon the upper hearth, and, when melted, is allowed to flow into the lower receptacle, and accumulated until such quantity is ready to pour as it is desired to use.

When it is desired to puddle iron in the lower hearth, a tool may be introduced to stir and work the same through the door *k*, as shown in Fig. 1. When one charge has been melted and passed down into the lower hearth, and is being puddled, another charge may be placed in the upper hearth and melted, ready to flow down when the other has been balled up and taken out, and thus the process may be made connected and continuous, and by means of one fire and but one furnace.

While I have described my invention as applicable to the puddling of iron, it may also be used to puddle steel, and the same furnace may be used to reduce metallic ores.

Having thus described my invention, what I claim, and desire to secure by Letters Patent, is—

1. A melting-hearth adjacent to and receiving heat directly from the furnace B, and a receptacle or hearth for storing or treating melted metal, the former located above and at one side of the other, and the two connected by a conduit, passage, or gutter, all arranged within the same furnace, and treated by the same fire, as and for the purposes described.

2. In a furnace of the character herein specified, the combination of a melting-hearth adjacent to and receiving heat directly from the furnace B, and a receptacle or hearth for storing or treating melted metal, the two being connected by the conduit or passage G, and provided with suitable doors, the whole being located and arranged as and for the purposes set forth.

Signed at Troy, New York, August 21, 1876.

GEORGE W. SWETT.

Witnesses:

WM. LORD,

LOUIS LOEWENSTEIN.